United States Patent [19]

King et al.

[11] Patent Number: 5,213,161

[45] Date of Patent: May 25, 1993

[54] WELL CEMENTING METHOD USING ACID REMOVABLE LOW DENSITY WELL CEMENT COMPOSITIONS

[75] Inventors: Bobby J. King; Patty L. Totten, both of Duncan, Okla.

[73] Assignee: Halliburton Company, Duncan, Okla.

[21] Appl. No.: 838,632

[22] Filed: Feb. 19, 1992

[51] Int. Cl.$^5$ .............................................. E21B 33/13
[52] U.S. Cl. ..................................... 166/293; 106/686; 106/688
[58] Field of Search ................ 166/293, 292; 106/685, 106/686, 688

[56] References Cited

U.S. PATENT DOCUMENTS

| | | | |
|---|---|---|---|
| 2,598,980 | 6/1952 | Denning | 106/86 |
| 2,702,753 | 2/1955 | Dickey | 106/88 |
| 3,573,941 | 4/1971 | Edwards et al. | 106/88 |
| 3,778,304 | 12/1973 | Thompson | 117/138 |
| 3,816,148 | 6/1974 | Barthel | 106/107 |
| 4,300,633 | 11/1981 | Stewart | 166/250 |
| 4,415,366 | 11/1983 | Copening | 106/86 |
| 4,466,833 | 8/1984 | Spangle | 106/88 |
| 4,676,318 | 6/1987 | Myers et al. | 166/293 |
| 5,147,565 | 9/1992 | Bour et al. | 166/293 X |

*Primary Examiner*—Stephen J. Novosad
*Attorney, Agent, or Firm*—Thomas R. Weaver; C. Clark Dougherty, Jr.

[57] ABSTRACT

Low density well cement compositions which set into hard substantially impermeable masses, but which are removable by dissolution in acid, and methods of utilizing such compositions for forming removable cement plugs or seals in subterranean zones are provided. The compositions are comprised of pumpable foamed slurries of magnesium oxychloride cement.

9 Claims, No Drawings

WELL CEMENTING METHOD USING ACID REMOVABLE LOW DENSITY WELL CEMENT COMPOSITIONS

BACKGROUND OF THE INVENTION

1. Field of the Invention

This invention relates to lightweight well cement compositions and methods for forming cement plugs or seals in subterranean zones which can subsequently be removed.

2. Description of the Prior Art

In the drilling and completion of well bores penetrating subterranean formations containing hydrocarbons, voids and other highly permeable zones within the formations are often encountered. Such zones can cause a variety of problems including the loss of expensive drilling or completion fluids thereinto. Heretofore, lost circulation treatments whereby plugging materials such as walnut hulls, mica and cellophane have been used to prevent or lessen the loss of fluids from well bores. The disadvantages of such treatments include the potential for damage to hydrocarbon bearing formations as a result of the inability to remove the plugging materials therefrom, and the dislogement of the plugging materials from highly permeable zones whereby fluid losses subsequently resume.

A more preferable technique for preventing lost circulation problems has been to temporarily plug voids or permeable zones with magnesium oxychloride cement compositions. Solid magnesium oxychloride cements can be removed with minimal damage to hydrocarbon bearing zones or formations by dissolution in acids. However, prior magnesium oxychloride cement compositions utilized in well drilling and completion applications have relatively high densities whereby they can not be utilized in applications calling for low density cements.

Thus, there is a need for low density magnesium oxychloride cement compositions and methods whereby removable plugs or seals can be formed in subterranean zones therewith.

SUMMARY OF THE INVENTION

By the present invention improved removable low density magnesium oxychloride well cement compositions and methods are provided which overcome the shortcomings of the prior art and meet the need recited above. The compositions are basically comprised of magnesium oxide, an aqueous magnesium chloride solution, an acid soluble filler, a foaming agent, a foam stabilizer and a gas entrained in the slurry in an amount sufficient to obtain the desired low density. The compositions set into hard substantially impermeable masses which can be permanently left in subterranean zones or removed by dissolution in acids.

Methods of using the low density cement compositions of this invention for forming removable cement plugs or seals in subterranean zones are also provided.

It is, therefore, a general object of the present invention to provide improved removable low density well cement compositions and methods.

Other and further objects, features and advantages of the present invention will be readily apparent to those skilled in the art upon a reading of the description of preferred embodiments which follows.

DESCRIPTION OF PREFERRED EMBODIMENTS

The improved magnesium oxychloride cement compositions of this invention are operable over a broad temperature range, i.e., they set into hard substantially impermeable masses at temperatures ranging from 80° F. to 220° F. and higher, and the cement compositions are lightweight as a result of being foamed. Once placed in subterranean zones to seal or plug the zones or for other purposes, the cement compositions can be permanently left in the zones or they can be removed by dissolution in acids.

The low density well cement compositions of this invention are basically comprised of magnesium oxide, an aqueous magnesium chloride solution, an acid soluble filler, a foaming agent, a foam stabilizer and a gas entrained in said slurry in an amount sufficient to obtain a desired slurry density.

The mixture of magnesium oxide and aqueous magnesium chloride solution forms magnesium oxychloride cement (also known as Sorel cement) which with time, solidifies into a substantially impermeable acid soluble mass. An acid soluble filler, preferably calcium carbonate, is combined with the magnesium oxide and magnesium chloride solution.

The magnesium oxide useful in accordance with this invention is that formed from magnesite, magnesium carbonate or synthetic magnesium hydroxide by high temperature calcination. Generally, for cement compositions of this invention which must set at temperatures in the range of from about 80° F. to about 120° F., the magnesium oxide is calcined at temperatures below about 1450° C. (2642° F.). For set temperatures in the range of from about 120° F. to 220° F. and higher, magnesium oxide calcined at temperatures higher than about 1450° C. is used.

Generally, an aqueous magnesium chloride solution containing magnesium chloride in an amount of from about 25% to about 34% by weight of solution is combined with the magnesium oxide in an amount in the range of from about 0.05 gallon to about 0.3 gallon per pound of magnesium oxide. The acid soluble filler is generally combined with the resulting magnesium oxychloride cement in an amount up to about 4 pounds per pound of magnesium oxide. The resulting slurry has a density in the range of from about 13 pounds per gallon to about 18 pounds per gallon and is pumpable, i.e., it can be pumped by way of the well bore or a conduit disposed therein into a subterranean zone to be cemented. In order to reduce the density of the slurry, a foaming agent and foam stabilizer are added to the slurry, and the slurry is foamed by entraining a gas therein.

A variety of foaming agents can be used which function to cause the gas to readily disperse in the form of small bubbles throughout the cement slurry. Examples of such foaming agents are alcohol sulfates, ethoxylated alcohol sulfates and salts thereof. Generally, a sulfated $C_6$ to $C_{15}$ alkyl alcohol ethoxylated with 2 to about 20 moles of ethylene oxide per mole or a salt thereof is preferred. Of these, the sodium salts of $C_6$ to $C_{10}$ alkyl alcohol ethoxylate sulfates with an average of about 3 moles of ethylene oxide per mole are preferred. The foaming agent utilized is generally added to the cement slurry in an amount in the range of from about 1% to about 5% by weight of the liquid components in the slurry, i.e., the aqueous magnesium chloride solution. A more preferred amount of foaming agent is in the range of from about 1% to about 4% by weight of the aqueous magnesium chloride solution in the composition. When the sodium salt of a sulfated $C_6$ to $C_{10}$ alkyl alcohol ethoxylated with an average of 3 moles of ethylene oxide is utilized, it is preferably included in the cement slurry in an amount of about 3% by weight of the aqueous magnesium chloride solution.

In addition to the foaming agent, it is usually necessary to include a foam stabilizing surfactant in the cement composition of this invention. The foam stabilizer functions to maintain the foam, i.e., to maintain the dispersion of the gas bubbles throughout the slurry, for the period of time required for the cement composition to be placed in the subterranean zone and to set into a hard substantially impermeable mass. Foam stabilizers which can be utilized include surfactants of the fatty amine betaines. Of these, cocoamine betaine is preferred. The foam stabilizer is generally included in the cement slurry in an amount in the range of from about 0.5% to about 2.5% by weight of aqueous magnesium chloride solution in the slurry. A more preferred range is from about 0.5% to about 2.0% by weight of the aqueous magnesium chloride solution in the slurry. When cocoamine betaine is utilized, it is preferably included in the slurry in an amount of about 0.75% by weight of aqueous magnesium chloride solution in the slurry.

As will be understood by those skilled in the art, instead of a foaming agent and a foam stabilizer, it is possible to utilize a single surface active compound which functions as both a dispersant for facilitating the formation of foam and a foam stabilizer for maintaining the cement slurry in the foamed state. In addition, other additives well known to those skilled in the art can be included in the cement compositions such as set retarders, fluid loss control additives and the like.

The gas utilized for forming the low density cement composition of this invention can be any gas which does not adversely react with components in the cement composition or in the subterranean formations or zones contacted by the cement composition. Preferably, the gas is selected from air or nitrogen, with nitrogen being the most preferred from the standpoint of economy and ease of mixing. The gas utilized is entrained in the cement slurry in an amount sufficient to lower the density of the cement slurry to a desired level. Generally, the gas is entrained in the cement slurry in an amount sufficient to lower the density of the slurry to a level in the range of from about 6 pounds per gallon to about 13.5 pounds per gallon.

A preferred acid soluble low density well cement composition of this invention is comprised of a slurry of magnesium oxide, a 27% to 32% by weight aqueous magnesium chloride solution present in an amount in the range of from about 0.1 gallon to about 0.3 gallon per pound of magnesium oxide in the slurry, an acid soluble solid filler present in an amount in the range of from about 0.4 pound to about 3 pounds per pound of magnesium oxide in the slurry, a foaming agent selected from the group consisting of ethoxylated alkyl alcohol sulfates wherein the sulfated alcohol is a $C_6$ to $C_{10}$ alkyl alcohol ethoxylated with an average of 3 moles of ethylene oxide per mole present in an amount in the range of from about 1% to about 4% by weight of the aqueous magnesium chloride solution, a foam stabilizer comprised of cocoamine betaine present in an amount in the range of from about 0.5% to about 2% by weight of the magnesium chloride solution, and a gas entrained in the slurry in an amount sufficient to obtain a desired slurry density.

The most preferred composition of the present invention is comprised of a pumpable slurry of magnesium oxide, a 27% by weight aqueous magnesium chloride solution present in an amount of about 0.16 gallon per pound of magnesium oxide in the slurry, calcium carbonate filler present in an amount of about 2 pounds per pound of magnesium oxide in the slurry, a foaming agent selected from the group consisting of the sodium salts of sulfated $C_6$ to $C_{10}$ alkyl alcohols ethoxylated with an average of about 3 moles of ethylene oxide per mole present in an amount of about 3% by weight of the aqueous magnesium chloride solution, a foam stabilizer comprised of cocoamine betaine present in an amount of about 0.75% by weight of the magnesium chloride solution in the slurry and air entrained in the slurry in an amount sufficient to obtain a slurry density in the range of from about 6.5 pounds per gallon to about 13.5 pounds per gallon.

In preparing the cement compositions of this invention, it is preferred that the dry components, i.e., the magnesium oxide, filler, retarder, and the like, are pre-blended and then mixed with the aqueous solution of magnesium chloride while agitating or stirring the mixture. The foaming agent and foam stabilizer are next combined with the slurry, and the slurry is foamed by entraining gas therein using conventional static or continuous foaming apparatus. For example, when air is utilized, a high speed atmospheric static mixer can be used which introduces air into the cement slurry until a predetermined volume of cement slurry having the desired density is produced. When nitrogen is utilized, it can be entrained in the cement slurry continuously by combining the slurry with the nitrogen in a high pressure continuous mixer. For field applications, metered foaming agent and stabilizer can be injected in-line prior to the in-line injection of the metered amount of gas required to obtain the desired downhole density.

In carrying out the method of the present invention for forming a selectively removable cement plug or seal in a subterranean zone penetrated by a well bore, an acid soluble low density cement slurry of the present invention which sets into a hard substantially impermeable mass is pumped into the subterranean zone by way of the well bore and then allowed to set in the zone whereby a plug or seal is formed therein. The substantially impermeable plug or seal formed can be left in the zone permanently, or the plug or seal can be removed. The removal is accomplished by pumping an aqueous acid solution into the zone containing the plug or seal whereby it is contacted with the aqueous acid solution and dissolved therein. While various aqueous acid solutions can be utilized for this purpose, a 15% by weight aqueous hydrochloric acid solution is generally preferred.

In order to further illustrate the cement compositions and methods of the present invention, the following examples are given.

EXAMPLE 1

Test cement slurries of the present invention were prepared comprised of pulverulent magnesium oxide calcined in air at a temperature of less than 1450° C.; a 27% by weight aqueous magnesium chloride solution present in an amount of 0.16 gallon of solution per pound of magnesium oxide; pulverulent calcium carbonate present in an amount of 1 pound of calcium carbonate per pound of magnesium oxide; a foaming agent comprised of the sodium salt of a sulfated $C_6$ to $C_{10}$ alkyl alcohol ethoxylated with an average of 3 moles of ethylene oxide; a foam stabilizer comprised of cocoamine betaine; and a set retarder comprised of disodium octaborate tetrahydrate. The foaming agent was present in each test slurry an amount of 3% by weight of the aqueous magnesium chloride solution in the slurry and the foam stabilizer was present in an amount of 0.75% by weight of the aqueous magnesium chloride solution. The retarder was present in the test slurries in amounts ranging from 0.5% to 8.0% by weight of the magnesium oxide in the slurries. The densities of the non-foamed test slurries were about 15.4 pounds per gallon.

In the preparation of the test slurries, the magnesium oxide, calcium carbonate and set retarder were pre-blended and added to and blended with the aqueous magnesium chloride solution in a blender. The resulting slurries were then individually placed in an Eberback one liter sealed stainless steel blender jar having a stacked blade assembly with four blades (an atmospheric foam generator). The particular amount of each test slurry was calculated based on the volume of the blender jar to produce a volume of cement slurry and air in the jar which when mixed resulted in a foamed cement slurry of desired density. The foaming agent and foam stabilizer were added to each test slurry in the blender jar, an air-tight lid was placed on the jar and the slurry and air in the jar were mixed at high speed for a fixed period of time to produce a foamed cement slurry. The foamed test slurries produced were cured at the temperatures indicated in Table I below in molds with rubber gasket seals and bolted covers. After curing for 24 hours, the set cement samples were tested for compressive strengths. The results of the tests are set forth in Table I below.

TABLE I

| Foamed Slurry Density, lb/gal | Retarder, % by Weight of MgO | Curing Temperature, °F. | 24 Hour Compressive Strength, psi |
| --- | --- | --- | --- |
| 6.5 | 0.5 | 80 | 280 |
| 8.0 | 0.5 | 80 | 660 |
| 9.5 | 0.5 | 80 | 1040 |
| 6.5 | 2.0 | 100 | 350 |
| 8.0 | 2.0 | 100 | 830 |
| 9.5 | 2.0 | 100 | 1270 |
| 6.5 | 8.0 | 120 | 300 |
| 8.0 | 8.0 | 120 | 560 |
| 9.5 | 8.0 | 120 | 870 |

From Table I it can be seen that the foamed low density cement compositions of the present invention function effectively at curing temperatures in the range of from 80° F. to 120° F.

EXAMPLE 2

Additional test cement slurries of the present invention were prepared utilizing magnesium oxide calcined in air at a temperature higher than 1450° C. The quantities of components were the same as those described in Example 1 except that calcium carbonate filler was combined with the other components of the slurries in an amount of 1.7 pounds per pound of magnesium oxide therein and various amounts of the retarder were used as shown in Table II below. Also, the test portions of the slurries were foamed with 275 psig nitrogen instead of with air. The non-foamed densities of the test slurries were about 15.4 pounds per gallon.

The procedure utilized for preparing the test slurries and the foamed test samples therefrom was the same as that described in Example 1 except that calculated amounts of the slurries were placed in a stirring MACS analyzer autoclave instead of an atmospheric foam generator. After the addition of each test amount, the foaming agent and foam stabilizer were added thereto. The stirring autoclave was then closed and pressurized to 275 psig with nitrogen. Each test slurry was stirred for 2 minutes at 100 rpm to establish a consistent unfoamed slurry and stirred at maximum rpm for 5 minutes to foam the sample. The resulting nitrogen foamed slurry then was transferred into a curing chamber prepressurized to 275 psig with nitrogen.

The foamed test slurries were cured at temperatures in the range of from 140° F. to 220° F. for 72 hours and then tested for compressive strengths. The results of these tests are set forth in Table II below.

TABLE II

| Foamed Slurry Density, lb/gal | Retarder, % by Weight of MgO | Curing Temperature, °F. | 72 Hour Compressive Strength, psi |
| --- | --- | --- | --- |
| 10.7 | 0.5 | 140 | 920 |
| 11.8 | 0.5 | 140 | 920 |
| 13.5 | 0.5 | 140 | 1420 |
| 8.4 | 1.5 | 160 | 240 |
| 10.7 | 1.5 | 160 | 290 |
| 11.9 | 1.5 | 160 | 730 |
| 13.5 | 1.5 | 160 | 1020 |
| 8.6 | 5.0 | 180 | 110 |
| 9.8 | 5.0 | 180 | 110 |
| 12.0 | 5.0 | 180 | 640 |
| 8.6 | 8.0 | 200 | 230 |
| 9.8 | 8.0 | 200 | 220 |
| 12.0 | 8.0 | 200 | 630 |
| 8.5 | 8.0 | 220 | 140 |
| 10.6 | 8.0 | 220 | 170 |
| 12.2 | 8.0 | 220 | 240 |

From Table II it can be seen that the cement compositions of the present invention function successfully at high curing temperatures.

EXAMPLE 3

A non-foamed cement slurry was prepared as described in Example 1 except that 1.5 pounds of calcium carbonate per pound of magnesium oxide, 1.5% by weight of the foaming agent and 1% by weight of a modified starch for viscosity improvement and fluid loss control were included in the slurry. The non-foamed slurry had a density of 16.1 pounds per gallon, and a 24 hour compressive strength of 580 psi when cured at 140° F. A portion of the slurry was foamed with air to a density of 9.2 pounds per gallon. The foamed cement composition had a compressive strength of 290 psi after 72 hours curing at a temperature of 140° F.

Thus, the present invention is well adapted to carry out the objects and attain the ends and advantages mentioned as well as those which are inherent therein. While numerous changes may suggest themselves to those skilled in the art, such changes are encompassed within the spirit of this invention as defined by the appended claims.

What is claimed is:

1. A method of forming a cement plug or seal in a subterranean zone penetrated by a well bore which can subsequently be removed by dissolution in acid comprising:

pumping a low density cement composition which sets into a hard substantially impermeable mass into said zone comprised of magnesium oxide, an aqueous magnesium chloride solution, calcium carbonate filler, a foaming agent, a foam stabilizer and a gas entrained in said slurry in an amount sufficient to obtain a desired slurry density; and allowing said cement composition to set in said zone.

2. The method of claim 1 wherein said foaming agent is selected from the group consisting of alcohol sulfates, ethoxylated alcohol sulfates and salts thereof.

3. The method of claim 2 wherein said foam stabilizer is selected from the group consisting of fatty amine betaines.

4. The method of claim 3 wherein said gas is selected from the group consisting of air and nitrogen.

5. The method of claim 4 wherein said aqueous magnesium chloride solution contains from about 25% to about 34% by weight magnesium chloride and is present in said slurry in an amount in the range of from about 0.05 gallon to about 0.3 gallon per pound of magnesium oxide therein.

6. The method of claim 5 wherein said calcium carbonate filler is present in said slurry in an amount up to about 4 pounds per pound of magnesium oxide therein.

7. The method of claim 6 wherein said foaming agent is selected from the group consisting of sodium salts of sulfated $C_6$ to $C_{10}$ alkyl alcohols ethoxylated with an average of about 3 moles of ethylene oxide per mole.

8. The method of claim 7 wherein said foaming agent is present in said slurry in an amount in the range of from about 1% to about 4% by weight of said aqueous magnesium chloride solution in said slurry.

9. The method of claim 8 wherein said foam stabilizer is cocoamine betaine present in said composition in an amount in the range of from about 0.5% to about 2.5% by weight of said aqueous magnesium chloride solution in said slurry.

* * * * *